May 1, 1945.  C. W. CURLE ET AL  2,374,655
TYPE SLUG SIDE TRIMMER
Filed Oct. 31, 1941   5 Sheets-Sheet 1
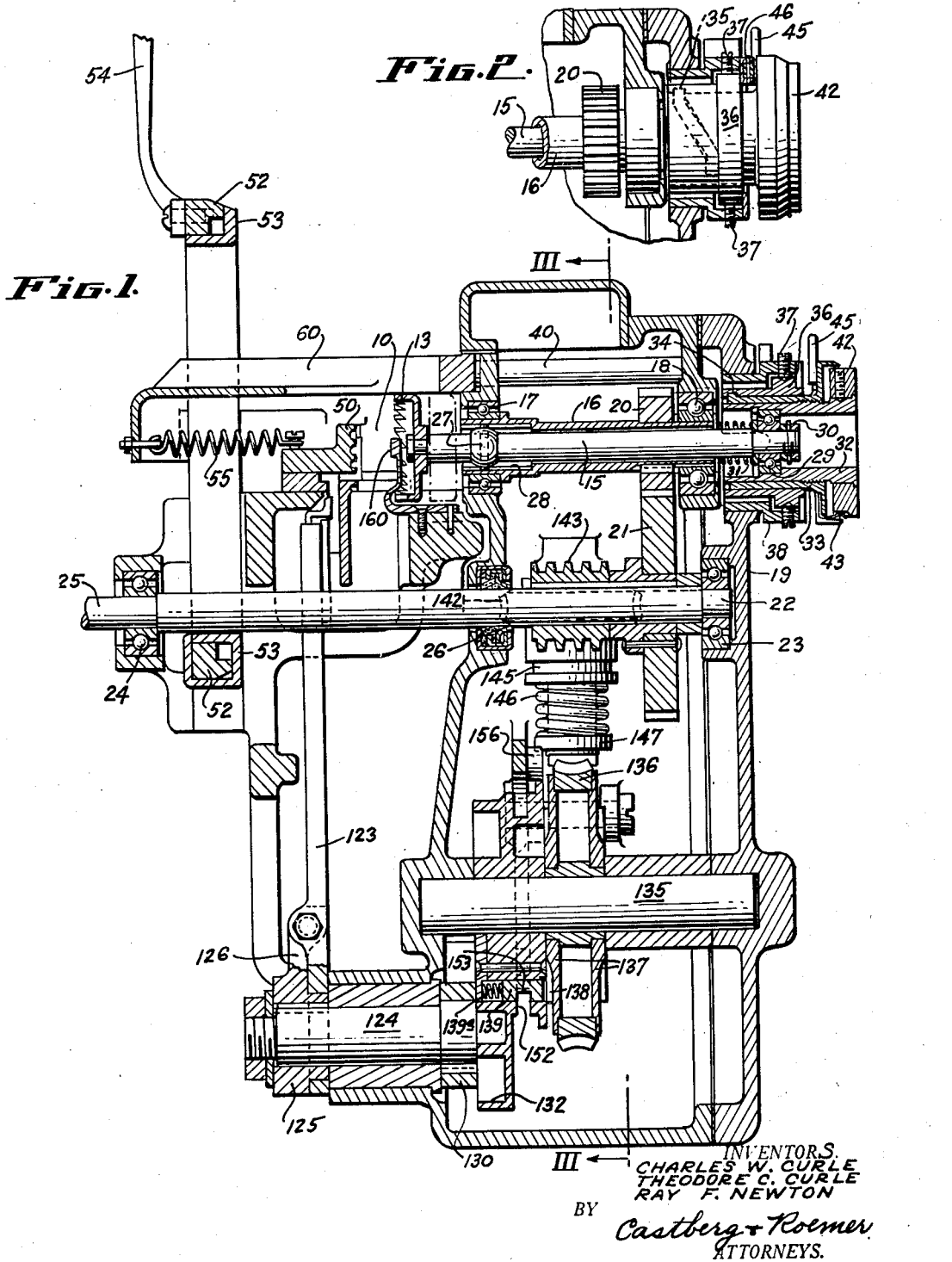

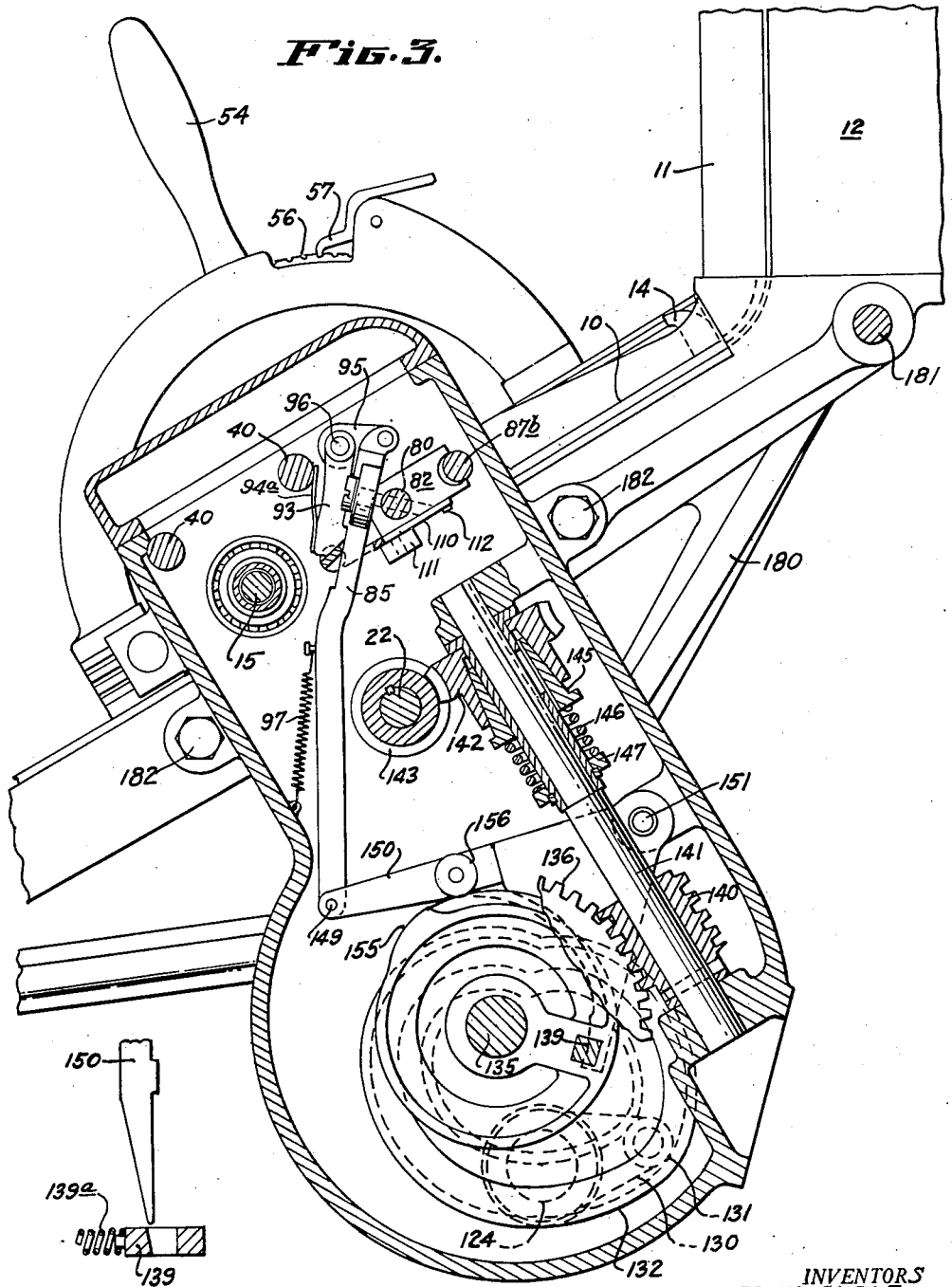

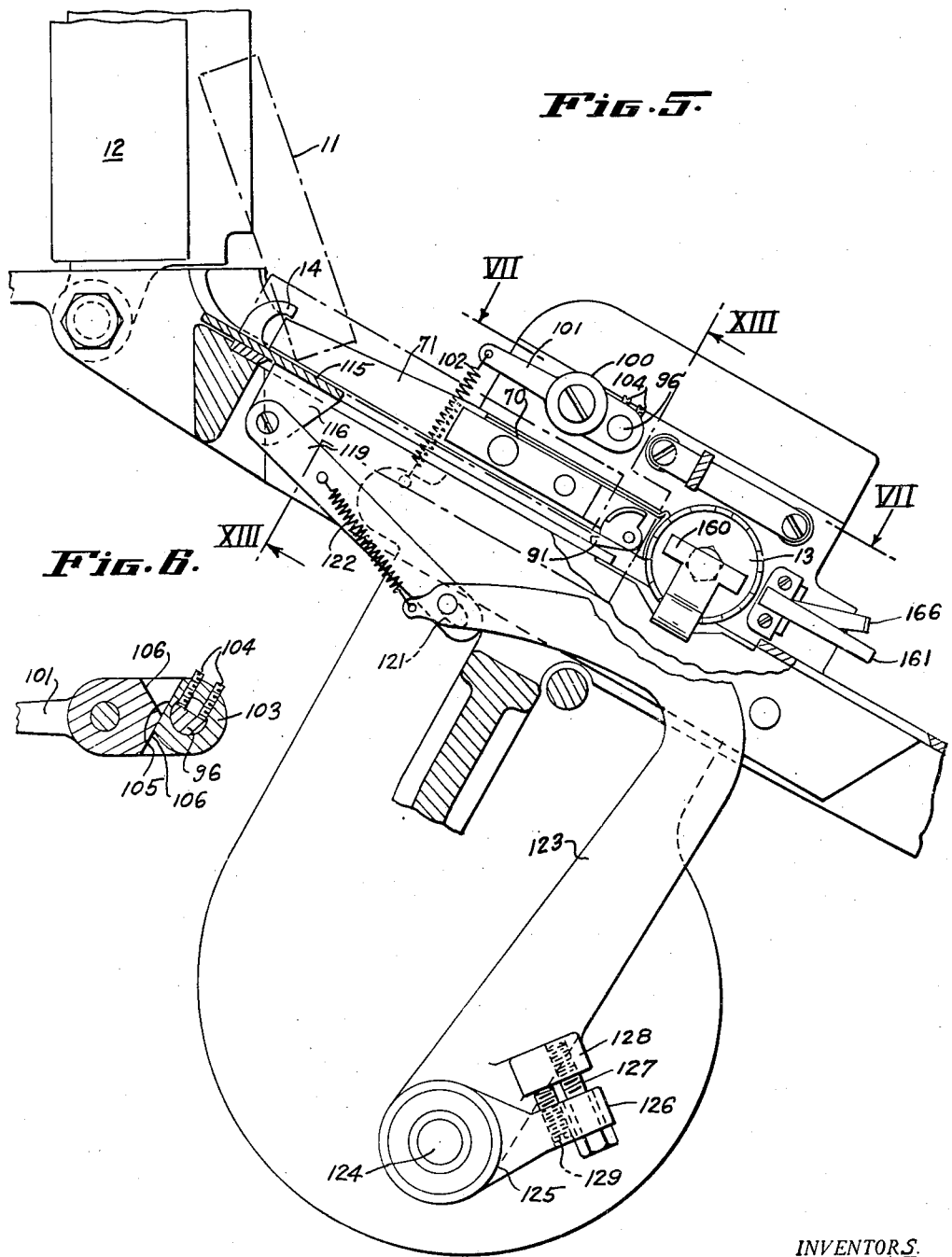

May 1, 1945.  C. W. CURLE ET AL  2,374,655
TYPE SLUG SIDE TRIMMER
Filed Oct. 31, 1941  5 Sheets-Sheet 4
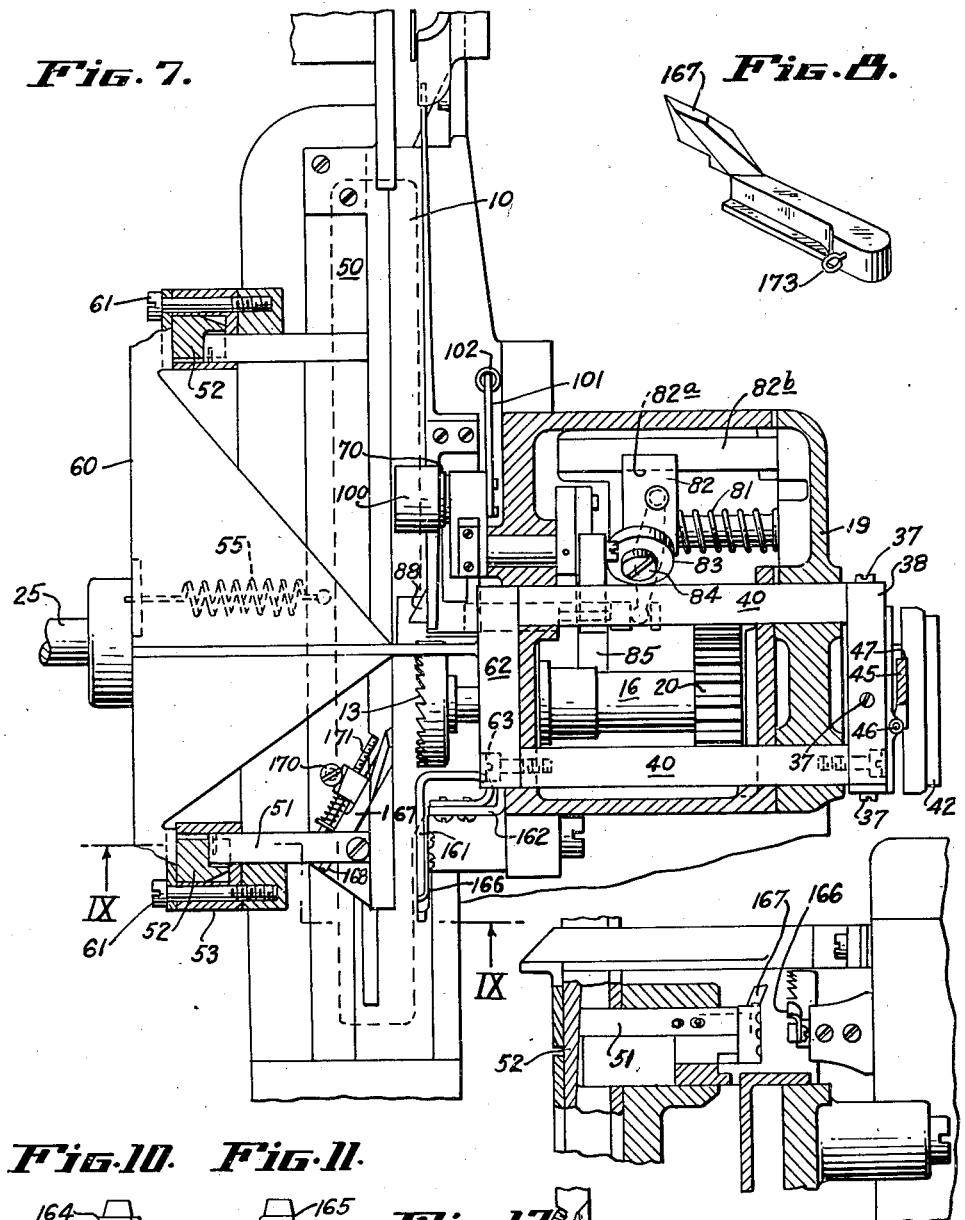
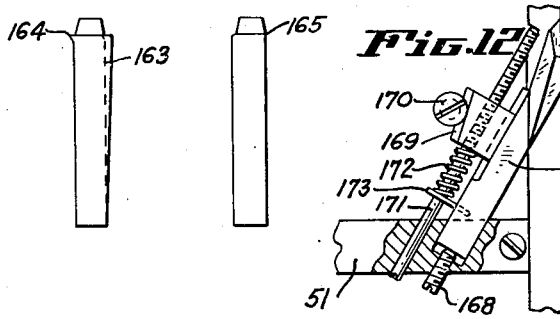
INVENTORS
CHARLES W. CURLE
THEODORE C. CURLE
RAY F. NEWTON
BY
Castberg & Roemer
ATTORNEYS.

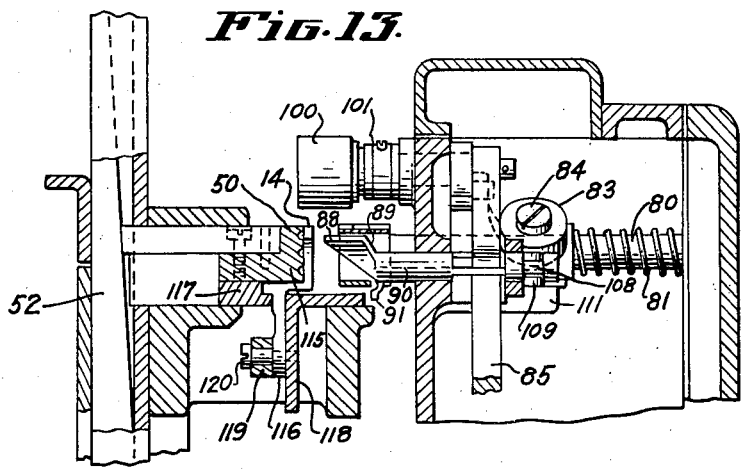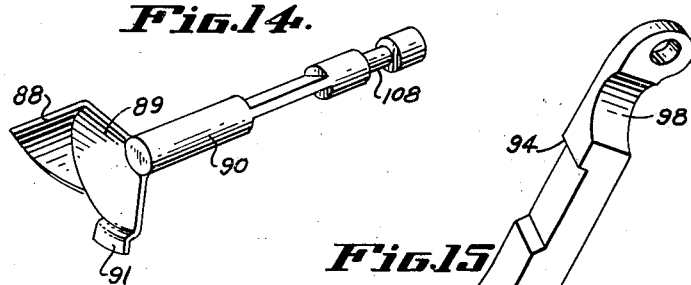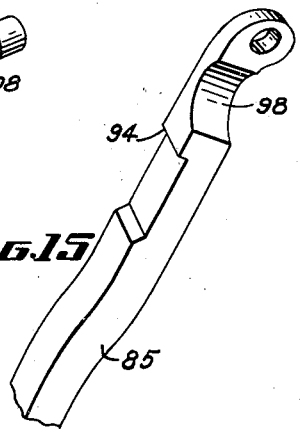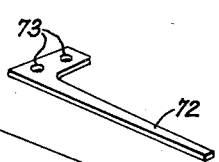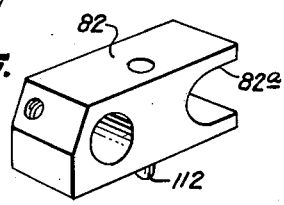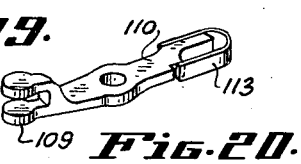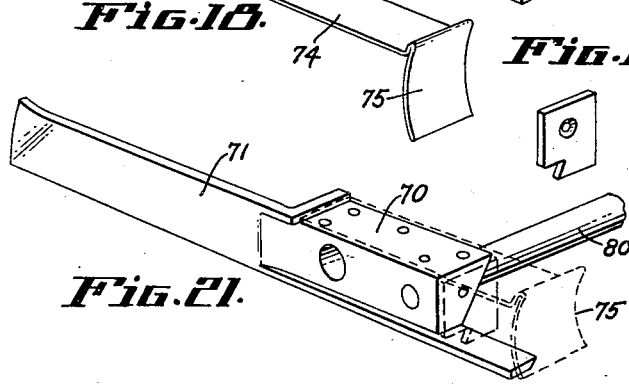

Patented May 1, 1945

2,374,655

UNITED STATES PATENT OFFICE 2,374,655

TYPE SLUG SIDE TRIMMER

Charles W. Curle, San Francisco, Theodore C. Curle, Ross, and Ray F. Newton, San Francisco, Calif.

Application October 31, 1941, Serial No. 417,346

9 Claims. (Cl. 90—17)

The present invention relates to a machine for trimming the side of a type slug after it is discharged from a line casting machine, so as automatically to eliminate variations in the thickness of the slug and to insure uniform thickness of a plurality of slugs discharged in rapid succession.

It is the object of the invention to provide an improved machine which operates automatically to eliminate variations in the thickness of a type slug, and which operates on slugs during their delivery from a line casting machine to a galley to cut or mill them with a high degree of accuracy to a standard thickness.

Further and more particular objects of the invention will be made apparent in the following specification, wherein reference is made to the accompanying drawings, illustrating a side trimming machine embodying the invention.

In the drawings—

Fig. 1 is a vertical transverse sectional view of a machine embodying the present invention;

Fig. 2 is an enlarged detail view of a portion of the mechanism illustrated in Fig. 1;

Fig. 3 is a sectional view taken on line III—III of Fig. 1;

Fig. 4 is a detail view of a clutch pin, in section, and a portion of an actuating lever therefor shown in Fig. 3;

Fig. 5 is a side elevation of the machine with parts in section and parts broken away;

Fig. 6 is an enlarged detail in section of a portion of the mechanism shown in Fig. 5;

Fig. 7 is a sectional view taken on line VII—VII of Fig. 5;

Fig. 8 is an enlarged perspective view of a knife shown in Fig. 7;

Fig. 9 is a section taken on line IX—IX of Fig. 7;

Fig. 10 is an end elevation of a slug before being trimmed;

Fig. 11 is a similar view of a slug trimmed by the machine of the present invention;

Fig. 12 is an enlarged detail with parts in section of a knife and mounting therefor shown in Fig. 7;

Fig. 13 is a section taken on line XIII—XIII of Fig. 5; and

Figs. 14 to 21 inclusive are perspective views of separate parts of the mechanism, illustrating details of construction thereof.

In the conventional line casting machine, a line of type or slug, as it is called, is produced in type metal with the type characters formed along one edge and with its opposite sides generally parallel to each other. One of these sides is customarily provided with transverse protruding ribs which may readily be trimmed to a plane parallel to the opposite side so that when the slugs are made up in a frame the lines of type characters will be presented in perfect parallelism.

The type slugs are discharged from the line casting machine with the type edge in a vertical position and gravitate through an inclined chute or slot to a galley in which they are held ready for assembly into a frame for printing.

In the drawings, an inclined slot 10 is shown as positioned to receive a slug 11 shown in dotted lines in Figs. 3 and 5, as it is discharged from the line casting machine, a portion of which is shown at 12.

The slug 11 is precipitated by gravity down the inclined slot 10, and as it passes therethrough is operated upon by a rotary cutter 13 to which its ribbed side is presented in passing in order to trim that side to exact parallelism with the other side and to produce a finished slug of a thickness which has been predetermined.

To compel the slug to move against the resistance offered by the cutter 13, a pusher 14 (see Figs. 3 and 5) follows it, engaging its upper end after it has started down the slot 10 and forcibly feeds it past the cutter 13. The cutter is continuously rotated by a shaft 15 to the end of which it is secured as shown in Fig. 1, and this shaft is contained in a tube 16 journaled for rotation in bearings 17 and 18 lodged in suitable cases formed in the walls of a transmission housing 19. A gear 20 keyed to the tube 16 meshes with a gear 21 carried and driven by a main shaft 22. The main shaft 22 is journaled in bearings 23 and 24 and has an end 25 projecting through the housing for connection with some suitable source of power such as an electric motor, not shown. A grease retainer 26 encircles the shaft at the point where it extends through the wall of the housing 19.

In order that the shaft 15, which carries the cutter, may be adjusted to move the cutter to and from the work and to effect angular adjustment thereof, it is connected with the interior of the tube 16 by means of a sliding universal joint which may comprise, as shown in Fig. 1, a spherical enlargement 27 on the shaft and a pin extending therethrough and terminating in elongated grooves 28 extending longitudinally of the inner wall of the tube. The opposite end of the cutter shaft 15 is journaled in a bearing 29 retained between a shoulder as shown and an end collar 30. A spring 31 surrounding the shaft is compressed between the end of the tube 16 and the inner face of the bearing 29, urging the shaft 15 to the right against a stop provided by the outer face of the bearing 29 and a shoulder formed interiorly of an adjustable bushing 32. Surrounding and threaded to the bushing 32 is a retractor sleeve 33. Surrounding this sleeve and connected with it through a pin 34 and groove 35, shown in Fig. 2 as disposed at an angle which will compel abrupt endwise movement of sleeve 33 upon rotation thereof, is a collar 36 supported by setscrews 37, preferably four in number, which are threaded through an annular case 38. This case 38 extends into a suitable opening in the wall of the housing 19 by which it is retained against transverse movement but permitted to slide or adjust itself axially or longitudinally with respect to the opening. Longitudinal movement of the case 38 is, however, prevented with respect to the slot 10, for reasons and by means hereinafter set forth in detail, by its rigid connection, as shown in Figs. 1 and 7, with the ends of a pair of rods 40 which extend through the housing 19 but which are free for slight longitudinal movement relative to the housing.

Through the mounting of the outer end of the shaft 15 which carries the cutter 13 at its inner end, just described, the cutter may be adjusted to a high degree of accuracy or may be retracted at will to an inoperative position. To adjust the cutter to a position with the plane of its cut parallel to the walls of the slot 10 or preferably at an angle just sufficient to effect cutting by the teeth on the side to which the slug is first presented, and slight clearance of the teeth on the opposite side, the setscrews 37 are adjusted. Through this adjustment the shaft 15 is swung on its universal support 27 in the tube 16 to the angle desired. Now to adjust the shaft 15 longitudinally and thereby vary the depth of the cut, the bushing 32 is rotated to advance or retract it through its threaded connection with the retractor sleeve 33. A hand wheel 42 is fixed to the outer end of the bushing to facilitate its rotation and the periphery of the wheel 42 is notched and calibrated. A spring detent 43 engages the notched periphery to make possible adjustments by regular increments of .001 inch, or 1/14 of a printer's point.

In order to retract the cutter to an inoperative position so that a slug may pass through the slot 10 without being trimmed, the retractor sleeve 33 which is normally latched against rotation is released, and the spring 31 forces the assembly, including the shaft 15, bushing 32 and sleeve 33, outwardly with a twisting motion which is compelled and limited by the angular groove 35 which acts as a thread of steep pitch. The means which normally prevents rotation and retraction of the sleeve 35 is shown in Figs. 1, 2 and 7 as a latch 45 pivoted as at 46 and having a shoulder 47 engaging a notch formed on the inner face of a flange formed at the outer end of the retractor sleeve. The latch is urged by a spring (not shown) to swing outwardly on its pivot 46. When it is swung inwardly the shoulder 47 disengages the retractor sleeve, which twists outwardly under pressure of the spring 31. Rotation of the retractor sleeve by hand returns it to its normal position where the latch 45 again retains it.

One side of the slot 10 is formed by a back bar 50 which, as shown in Fig. 7, is carried by a pair of rods 51 the outer ends of which engage a pair of identical arcuate inclined cams 52 which, together, form an annulus commonly termed a point ring. This point ring is encased and rotatable in an annular case 53. A handle 54 is secured to the ring and may be used to adjust the same in one direction to advance the back bar 50 and in the other direction to retract it through the medium of the cams 52 and a spring 55 (see Figs. 3 and 7) which urges the ends of the bars 51 into engagement with the cams 52 on the point ring. To define this adjustment of the slot 10 to increments of points, printer's measure, or .014 inch, the periphery of the point ring is notched as at 56 for engagement by a latch pawl 57 to retain it against rotation. The spacing of the notches 56 corresponds to the distance that the point ring will turn in advancing or retracting the back bar one point. With the back bar set in any desired position, the cutter 13 may be adjusted to or away from it in increments of .001 inch by the means above described, so that the thickness of the slug may be predetermined within narrow limits.

When the back bar 50 and cutter 13 have been adjusted any slug passing down the slot 10 will be trimmed to a thickness which theoretically will be the same as the spacing between the back bar and the cutter. It has been found, however, that due to the strain imposed upon the housing 19 by the shafts journaled therein, and possibly somewhat by the expansion and contraction of the metal thereof, there is a tendency to weaving of the housing relative to the back bar and its supporting framework. To obviate this tendency and rigidly hold the back bar and cutter against relative movement, a bracing frame 60 (see Figs. 1 and 7) is secured to the point ring case 53 as by screws 61 and extends through the ring and is connected by a bar 62 and screws 63 to the ends of the rods 40 which connect, as set forth above, with the cutter shaft assembly. As the back of the point ring and back of the cutter assembly are thus rigidly connected by means which permits slight floating movement of the housing 19, any such movement of the latter will not be transmitted to the cutter, which will therefore trim slugs to exact and uniform thickness.

While one wall of the slot 10 is formed by the back bar 50 which remains stationary during operation of the machine, the opposite wall is defined by a slug presser bar 70 (see Figs. 5, 7, and 21) which normally dwells in the position of Fig. 7 to provide a wide slot for the reception of a slug as it comes from the line casting machine. As the slug enters the slot 10, the presser bar 70 moves to engage and press it firmly against the back wall 50. At this time the slug pusher 14 engages the upper end of the slug and feeds it past the cutter. The presser bar 70, as shown in Fig. 21, has its upper end reduced in thickness to form a resilient leaf 71 which is preferably bent very slightly toward the back wall of the slot to insure a yielding pressure against the upper end of the slug therein. The lower end may be provided with a spring 72 (see Fig. 17) fitted, by screws passing through holes 73, onto the top of the bar 70 and engageable with the lower end of the slug to press it into firm contact with the back bar as it approaches the cutter. A guard 74, shown in Fig. 18, may be secured to the presser bar by the same screws and has an apron 75 which occupies the dotted line position shown in Fig. 21 to prevent chips from the cutter from lodging in a position where they might affect the smooth operation of the presser bar or accuracy of the cut. The rear of the presser bar is shown as formed on an angle, so as to eliminate abutting flat surfaces between which chips from the cutting operation might gather and become packed.

The presser bar is secured to the outer end of a rod 80 reciprocally mounted in the wall of the housing 19 and urged toward the back bar by a spring 81 (see Figs. 7 and 13) compressed between the housing 19 and a block 82 secured to the bar 80. This block 82 is notched as at 82a (see also Fig. 16) to embrace a rod 82b to prevent rotation of the block and shaft 80 upon which it is mounted. A roller 83 mounted on the block 82 by a shoulder screw 84 engages a link 85 which normally retains the presser bar in its retracted position.

The advancement of the presser bar and feeding movement of the slug 14 are initiated automatically by the movement of the slug down the slot 10. This occurs when the lower end of the slug strikes a trip 88 which projects into the slot and is carried by a radial plate 89 on the end of a trip shaft 90 which projects into the housing and is slidably and rotatably journaled in the wall thereof; a stop lug 91 also carried on the plate 89 limits the rotary movement of the trip shaft by engagement with the lower edge of the presser bar or of the plate shown in Fig. 19, as may be seen from the position illustrated in Fig. 5. When the descending slug strikes the trip 88, it rotates the trip shaft 90 a few degrees and comes to rest. This rotation of the trip shaft causes a flat portion 92 thereon to rock a pawl 93 (see Fig. 3) out of engagement with a notch 94 formed in the back of a link 85 (see Fig. 15), the pawl being normally held in such engagement by a spring 94a thereon. The link 85 is pivoted at its upper end to a crank 95 fixed to a freely rotatable stub shaft 96, and when released by the pawl, moves downwardly generally in the direction of its length under tension of a spring 97. Upon this downward movement the roller 83 moves into a notch 98 in the link 85 and permits the bar 80 and presser bar carried thereby to be advanced under pressure of the spring 81. The slug which occupies the slot 10 is thus pressed firmly against the back bar 50 and is at the same time held down against the bottom of the slot by a roller 100 which is preferably faced with rubber. This roller 100 is mounted on the side of a lever 101 pivoted at one end to the stub shaft 96 and urged downwardly by a spring 102 engaging its other end. The pivoted end of the lever is bifurcated and embraces a collar 103 fixed against rotation on the shaft 96 by setscrews 104. The collar 103 has a flat side 105 (see Fig. 6) normally engageable with a shoulder 106 on the lever 101 to retain the lever in a raised position. As the inner end of the stub shaft 96 carries the crank 95 the downward movement thereof which accompanies release of the latch 93 permits the roller 100 to descend against the slug under tension of the spring 102 simultaneously with the advancing of the presser bar 70.

At the same instant the trip 88 which extends into the slot in the path of the slug is retracted to permit the slug to be forcibly advanced to the cutter. For this purpose the trip bar 90 is grooved as a 108 to receive the bifurcated end 109 of a lever 110 (see Figs. 3, 13 and 20) which is centrally pivoted to a bracket 111 which extends inwardly from an inner wall of the housing 19. The opposite end of the lever is loosely connected with a pin 112 on the lower side of the block 82. Thus, movement of this block, which accompanies advancing of the presser bar, swings the lever 110 and slides the trip bar 90 to retract the trip 88 at its outer end. As shown in Fig. 20, the rear end of the lever 110 is fitted with a resilient keeper 113 which receives the pin 112 and yields to prevent breakage in the event the trip bar 90 is forced inwardly as by inadvertent adjustment of the back bar while a slug is disposed in front of the trip 88.

Immediately upon the slug being held against the back bar and bottom of the slot in the manner just described, the pusher 14 engages its uppermost end and forcibly feeds it past the cutter 13. As shown in Figs. 5 and 13, the pusher 14 is carried by a slide block 115 including a depending lug 116 slidable in a track formed of members 117 and 118 fixed with relation to the back bar 50. A link 119 is pivoted to the lug 116 by a shoulder screw 120 and connected as by a pin and slot 121 and spring 122 to the hooked upper end of a long crank 123 fixed to a shaft 124 (see Figs. 1 and 5). The connection between the crank and shaft includes a collar 125 keyed to the shaft and having a wing 126, which carries an adjusting screw 127 which enters a lug 128 on the crank 123 to adjust the crank on the shaft. A setscrew 129 serves to lock the screw 127 by pressure. The shaft 124 enters the housing 19 and carries a short crank 130, shown in dotted lines in Fig. 3, with a cam roller 131 at its end, traveling in a box cam 132 rotatably mounted on a countershaft 135. Also mounted on the countershaft 135 is a worm gear 136 with hardened side plates 137 notched as at 138 to receive a clutch pin 139 mounted in the box cam 132 and urged by a spring 139a into engaged position. The worm gear 136 is driven by a worm 140 on a shaft 141 which is rotated at reduced speed by a worm gear 142 and worm 143 on the main drive shaft 22. The worm gear 142 is connected with the shaft 141 by a slip clutch which will release in the event of jamming of any of the parts driven thereby. This slip clutch, which may be of any accepted type, is shown in Fig. 3 as including a tapered collar 145 splined to the shaft and pressed into friction driving engagement with the tapered bore of the gear by a spring 146 bearing on a thrust collar 147.

When the slug descending through the slot 10 strikes the trip it effects engagement of the clutch between the box cam 132 and worm gear 136 for a single cycle to operate the pusher through the mechanism described. The lower end of the bar 85, which has been described as moving downwardly upon operation of the trip, is pivoted as at 149 to a bell crank 150 which rocks on a pivot 151 and has a lower end guided in a peripheral groove 152 in the box cam and normally engaged in a notch 153 in the clutch pin 139 (see Fig. 4). This retains the clutch in disengaged position and permits it to engage and establish driving relationship between gear 136 and the box cam upon downward movement of the bar 85 which rocks the bell crank 150. The driving engagement of the clutch is limited to a single cycle by a rise 155 on the periphery of the box cam which, just prior to a complete rotation, engages a roller 156 on the bell crank 150 to return it to normal position where its lower end will enter the notch 153 in the clutch pin 139 and effect retraction thereof. The same movement of the bell crank raises the bar 85 until it is again latched by the pawl 93. Likewise the roller 83 rides out of the notch 98, with the result that the presser bar is retracted and the trip bar 90 is, through the lever 110, again advanced to a position where its trip 88 will again be positioned for engagement by a slug in the slot 10.

During progress of the slug past the cutter, it is held firmly against the back bar 50 by a spring finger 160 (see Figs. 1 and 5) which is secured to the frame of the machine below the cutter and curved as shown to clear the lower teeth and engage the slug centrally of the annulus formed by the cutter teeth. As the slug leaves the cutter, it is engaged by a spring finger 161 which also presses it against the back bar and which is secured to a bracket 162 which projects from the side of the housing.

In Fig. 10 a slug is shown in end elevation with the portion to be trimmed away designated by the dotted line 163. The side trimming cutter 13 removes this portion in the manner above described and produces a slug with parallel side walls, as shown in Fig. 11. It does not however act upon a casting fin often occurring at the edge 164 and the cutter sometimes produces a burr at 165. The latter is removed by a scraper 166 carried by the finger 161. The fin 164 is removed by a knife 167 (see Figs. 7, 8, 9 and 12) mounted behind the back bar with its cutting edge extending over the top of the bar and positioned to intercept the finned edge of the slug as it passes the cutter. This knife is mounted as shown in Fig. 12 with its back end received in a socket in the rod 51 and arranged to be advanced by an adjusting screw 168. A shouldered wedge 169 acts between a screw 170 and the knife to retain it in place and is brought into wedging position by rotation of a threaded pin 171 which extends through it. A spring 172 encircles the pin 171 and is compressed between the wedge and an eye 173 on the knife to urge the knife into contact with the adjusting screw 168.

The entire structure is supported by a main frame shown in part at 180 which may be rigidly secured to the line casting machine, as by bolts such as shown at 181; and the housing 19 is held by cap screws 182 to the side of the frame.

Having thus described and illustrated our invention, what we claim and desire to secure by Letters Patent is:

1. A device for side trimming a type slug as it passes through a slot, comprising a back bar forming one side of said slot, a rotary cutter at the opposite side, means to adjust the back bar relative to the cutter in increments of .014 inch, and means to adjust the cutter relative to the back bar in increments of .001 inch.

2. In a device for side trimming a type slug, a back bar forming one side of a slot through which the slug passes, a cutter opposed to said back bar, a presser bar opposed to the back bar, a pusher to engage and feed the slug past the cutter, and trip means engageable by the slug to effect advancement of the presser bar into clamping engagement with the slug, and to initiate feeding operation of said pusher.

3. In a device for side trimming a type slug, a back bar forming one side of a slot through which the slug passes, a cutter opposed to said back bar, a presser bar opposed to the back bar, a pusher to engage and feed the slug past the cutter, trip means engageable by the slug to effect advancement of the presser bar into clamping engagement with the slug, and to initiate feeding operation of said pusher, and means for automatically retracting the trip means upon advancement of the presser bar.

4. In a device for side trimming a type slug, a back bar forming one side of a slot through which the slug passes, a cutter opposed to said back bar, a presser bar opposed to the back bar, a pusher to engage and feed the slug past the cutter, trip means engageable by the slug to effect advancement of the presser bar into clamping engagement with the slug, and to initiate feeding operation of said pusher, and means for automatically retracting the trip means upon advancement of the presser bar, said last named means including a resilient connection to give way in the event of accidental pressure on the trip means.

5. In a device for side trimming a type slug, a cutter, a rotary shaft therefor, a tubular shaft enclosing the rotary shaft, means for driving said shaft to rotate the cutter, and means independent of the drive means for adjusting the shaft axially and angularly relative to said tubular shaft.

6. In a device for side trimming a type slug, a cutter, a rotary shaft therefor, a rotary tubular shaft enclosing the first shaft, a driving connection between said shafts, means independent of the drive means for adjusting the first shaft axially and angularly relative to the tubular shaft, and means for retracting the first shaft relative to the tubular shaft to withdraw the cutter from its operative position.

7. In a device for side trimming a type slug, a cutter, a rotary shaft therefor, means for driving said shaft to rotate the cutter, means independent of the drive means for adjusting the shaft axially and angularly, and means including a spring and latch for effecting retraction of the shaft to withdraw the cutter from its operative position.

8. In a device for side trimming a type slug, a cutter, a rotary shaft carrying said cutter, a hollow shaft embracing said rotary shaft, having a driving connection therewith permitting axial and angular adjustment of the rotary shaft, a bearing for the end of said rotary shaft opposite to the end by which the cutter is carried, and a support for said bearing including means to adjust the same axially and radially.

9. In a device for side trimming a type slug, a cutter, a rotary shaft carrying said cutter, a hollow shaft embracing said rotary shaft, having a driving connection therewith permitting axial and angular adjustment of the rotary shaft, a bearing for the end of said rotary shaft opposite to the end by which the cutter is carried, and a support for said bearing including means to adjust the same axially and radially, and including means to effect spring-compelled retraction of the shaft to withdraw the cutter from its operative position.

CHARLES W. CURLE.
THEODORE C. CURLE.
RAY F. NEWTON.